US007642957B2

(12) United States Patent
Lennen et al.

(10) Patent No.: US 7,642,957 B2
(45) Date of Patent: Jan. 5, 2010

(54) GPS SYSTEM UTILIZING MULTIPLE ANTENNAS

(75) Inventors: Gary Lennen, Cupertino, CA (US); Daniel Babitch, San Jose, CA (US)

(73) Assignee: SIRF Technology, Inc., San Jose, CA (US)

( * ) Notice: Subject to any disclaimer, the term of this patent is extended or adjusted under 35 U.S.C. 154(b) by 90 days.

(21) Appl. No.: 11/945,269

(22) Filed: Nov. 27, 2007

(65) Prior Publication Data

US 2009/0135060 A1    May 28, 2009

(51) Int. Cl.
*G01S 1/02*    (2010.01)
*G01C 21/00*   (2006.01)

(52) U.S. Cl. .................... 342/357.06; 342/357.12; 701/213

(58) Field of Classification Search .......... 342/357.02, 342/357.06, 357.09, 357.12; 701/213, 215
See application file for complete search history.

(56) References Cited

U.S. PATENT DOCUMENTS

| | | | | |
|---|---|---|---|---|
| 5,202,829 A | * | 4/1993 | Geier | ............... 701/215 |
| 5,663,734 A | | 9/1997 | Krasner | |
| 5,663,735 A | | 9/1997 | Eshenbach | |
| 5,781,156 A | | 7/1998 | Krasner | |
| 5,812,087 A | | 9/1998 | Krasner | |
| 5,825,327 A | | 10/1998 | Krasner | |
| 5,831,574 A | | 11/1998 | Krasner | |
| 5,841,026 A | * | 11/1998 | Kirk et al. | ............. 73/178 R |
| 5,841,396 A | | 11/1998 | Krasner | |
| 5,874,914 A | | 2/1999 | Krasner | |
| 5,884,214 A | | 3/1999 | Krasner | |
| 5,916,300 A | * | 6/1999 | Kirk et al. | ............... 701/213 |
| 5,945,944 A | | 8/1999 | Krasner | |
| 5,999,124 A | | 12/1999 | Sheynblat | |
| 6,002,363 A | | 12/1999 | Krasner | |
| 6,016,119 A | | 1/2000 | Krasner | |
| 6,052,081 A | | 4/2000 | Krasner | |
| 6,061,018 A | | 5/2000 | Sheynblat | |
| 6,064,336 A | | 5/2000 | Krasner | |
| 6,104,338 A | | 8/2000 | Krasner | |
| 6,104,340 A | | 8/2000 | Krasner | |
| 6,107,960 A | | 8/2000 | Krasner | |
| 6,111,540 A | | 8/2000 | Krasner | |
| 6,131,067 A | | 10/2000 | Girerd | |
| 6,133,871 A | | 10/2000 | Krasner | |
| 6,133,873 A | | 10/2000 | Krasner | |
| 6,133,874 A | | 10/2000 | Krasner | |
| 6,150,980 A | | 11/2000 | Krasner | |
| 6,185,427 B1 | | 2/2001 | Krasner | |

(Continued)

OTHER PUBLICATIONS

Marketing Material/White Paper: SnapTrack: A Qualcomm Company—SnapTrack's Wireless Assisted GPS™ (A-GPS) Solution Provides the Industry's Best location System—Location Technologies for GSM, GPRS and WCDMA Networks (Qualcomm CDMA Technologies: Enabling the Future of Communications) (4 pages), year 2003.

(Continued)

*Primary Examiner*—Dao L Phan
(74) *Attorney, Agent, or Firm*—Duane Morris LLP

(57) ABSTRACT

A GPS Mobile Unit is described. The GPS Mobile Unit may include at least two antennas, at least two GPS receivers, and a position solution module in signal communication with the at least two GPS receivers.

23 Claims, 11 Drawing Sheets

U.S. PATENT DOCUMENTS

| | | |
|---|---|---|
| 6,208,290 B1 | 3/2001 | Krasner |
| 6,208,291 B1 | 3/2001 | Krasner |
| 6,215,441 B1 | 4/2001 | Moeglein |
| 6,215,442 B1 | 4/2001 | Sheynblat |
| 6,236,354 B1 | 5/2001 | Krasner |
| 6,239,742 B1 | 5/2001 | Krasner |
| 6,259,399 B1 | 7/2001 | Krasner |
| 6,272,430 B1 | 8/2001 | Krasner |
| 6,289,041 B1 | 9/2001 | Krasner |
| 6,307,504 B1 | 10/2001 | Sheynblat |
| 6,313,786 B1 | 11/2001 | Sheynblat |
| 6,314,308 B1 | 11/2001 | Sheynblat |
| 6,377,209 B1 | 4/2002 | Krasner |
| 6,408,196 B2 | 6/2002 | Sheynblat |
| 6,411,254 B1 | 6/2002 | Moeglein |
| 6,411,892 B1 | 6/2002 | Van Diggelen |
| 6,417,801 B1 | 7/2002 | Van Diggelen |
| 6,421,002 B2 | 7/2002 | Krasner |
| 6,429,814 B1 | 8/2002 | Van Diggelen et al. |
| 6,433,731 B1 | 8/2002 | Sheynblat |
| 6,453,237 B1 | 9/2002 | Fuchs et al. |
| 6,456,233 B1 * | 9/2002 | Zhodzishky et al. ... 342/357.02 |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,542,821 B2 | 4/2003 | Krasner |
| 6,583,757 B2 | 6/2003 | Krasner |
| 6,597,311 B2 | 7/2003 | Sheynblat |
| 2002/0039904 A1 * | 4/2002 | Anderson ............ 455/456 |

OTHER PUBLICATIONS

Marketing Material/Press Release: Broadcom Introduces Advanced Single-Chip GPS Solution for Mobile Applications (3 pages), Oct. 15, 2007.

Marketing Material: Global Locate—Hammerhead II™, Single Chip AGPS Solution (2 pages), year 2007.

Marketing Material: uNav Microelectronics, uN9x18 Low Power, High Performance GPS Receiver Chipset (2 pages), Jul. 21, 2006.

Marketing Material: uNav Microelectroncis—uN9x18 Low Power, High Performance GPS Receiver Chipset/uN9x18 GPS Receiver Solution (9 pages), year 2006.

Marketing Material: Qualcomm CDMA Technologies—Integrated Solutions—MGP6200™ Multimode GPS Processor (8 pages), year 2002.

* cited by examiner

GPS SYSTEM UTILIZING MULTIPLE ANTENNAS

BACKGROUND OF THE INVENTION

1. Field of Invention

This invention relates in general to satellite navigation systems and in particular to Global Positioning System ("GPS") receivers utilizing multiple antennas.

2. Related Art

Cellular telephony, including the use of Personal Communication System ("PCS") devices, has become commonplace. The use of such devices to provide voice, data, and other services, such as Internet access, has provided many conveniences to cellular system users.

A current thrust in the cellular and PCS area is the integration of Global Positioning System ("GPS") technology into cellular telephone devices and other wireless devices to provide satellite navigation. This current interest in integrating GPS with cellular telephony stems from a Federal Communications Commission ("FCC") requirement that cellular telephones be locatable within 50 meters once an emergency call, such as a "911" call (also referred to as Enhanced 911 or "E911") is placed by a given cellular telephone. This position data assists police, paramedics, and other law enforcement and public service personnel, as well as other agencies that may need or have legal rights to determine the cellular telephone's position. Further, GPS data can be used by the cellular user for directions, location of other locations that the cellular user is trying to locate, determination of relative location of the cellular user to other landmarks, directions for the cellular user via Internet maps or other GPS mapping techniques, etc. Such data can be of use for other than E911 calls, and would be very useful for cellular and PCS subscribers.

However, since cellular telephones can travel into areas where GPS signals cannot be reliably received, augmentations to the GPS system are being researched to support the E911 and other GPS/cellular applications. GPS is increasingly being pressed into service in the cellular telephone/PDA/mobile computer application where a solution is required in areas with substantial blockage, such as inside buildings, in subway stations, and other areas where the system RF link budget is difficult to sustain communications with mobile units that travel into hostile signal reception environments such a buildings.

FIG. 1 is a block diagram of an example GPS Mobile Unit 100 that is capable of receiving GPS signals 102, 104, 106, and 108 from a plurality of GPS satellites 110, 112, 114, and 116, respectively, in a clear view environment. The GPS Mobile Unit 100 may include a GPS Receiver 118, Antenna 120, Frequency Source 122, and Position Solution Module 124. Generally, the signal Antenna 120 element is used to receive the signals 102, 104, 106, and 108 typically emanating from the multiple satellites 110, 112, 114, and 116. Examples of the Antenna 120 element may include, for example, chip antennas, wire antennas, and ceramic patch antennas. The GPS receiver 118 performs RF amplification, filtering, mixing, digitizing, and individual satellite tracking functions. The resulting GPS measurements 126 of range, timing, and Doppler etc., are extracted from the GPS receiver 118 in a manner known to the prior art. These GPS measurements 126 are then processed by the position solution module 124 that uses the GPS measurements 126 to compute user position, velocity, time etc. of the GPS Mobile Unit 100. Unfortunately, one limitation of the architecture shown in FIG. 1 is that the position solution 128 availability and accuracy is largely dependent on the received GPS signals 130 from the single source Antenna 120.

As an example of the limitations associated with a single antenna, in FIG. 2 a system diagram of a GPS Mobile Unit 200 in a multi-path environment with blockage is shown. The GPS Mobile Unit 200 may be located within structure 202 that partially blocks some to the GPS signal 204, 206, 208, 210, 212, and 214 from GPS satellites 216, 218, 220, and 222, respectively. The structure 202, as an example, may be a building, natural or man-made environmental structure (such as a canyon wall or street in a city with tall building).

As an example, a single indoor GPS antenna 223 may receive each GPS satellite 216, 218, 220, and 222 via multiple paths as the signal reflects from the blockage or possible objects in the structure 202. The received multi-path signals may result in constructive or destructive interference, with constructive interference increasing signal power and destructive interference reducing signal power. Generally, when the single GPS antenna 223 observes destructive multi-path interference (also known as "flat fading") the resulting signal loss cannot be recovered.

Specifically as an example, GPS signals 204 and 208 are blocked by part 220 of the structure 202 while GPS signals 206, 210, 212, and 214 are passed into the interior 224 of the structure 202. However, in this example, only GPS signals 212 and 214 are directly received by GPS Mobile Unit 200 while GPS signals 206 and 210 are indirectly received by the GPS Mobile Unit 200 via multi-path GPS signals 226 and 228, respectively, that may be reflected off of an inside wall 232 of the structure 202.

Unfortunately, in previous and current teachings the use of multi-path GPS signals for satellite navigation is typically avoided because multi-path GPS signals give less accuracy and in satellite navigation, accuracy was and remains the prime goal.

As a result, there is a need for a system and method capable of receiving GPS signals and producing a location for a GPS Mobile Unit in bad propagation conditions where GPS signals are weak and blocked, and short delay, strongly interfering multi-path is dominant.

SUMMARY

A GPS Mobile Unit is described. The GPS Mobile Unit may include at least two antennas, at least two GPS receivers, and a position solution module in signal communication with the at least two GPS receivers. In this example, each GPS receiver of the at least two GPS receivers is in signal communication with each antenna of the at least two antennas and the position solution module may be configured to receive GPS measurements and quality indicators from the at least two GPS receivers and, in response, determine a GPS location for the GPS Mobile Unit.

As an example of operation, the GPS Mobile Unit may perform a method for receiving a plurality of GPS signals, at the GPS Mobile Unit, from a plurality of GPS satellite utilizing at least two antennas and, in response, determining a location for the GPS Mobile Unit. The method may include receiving the plurality of GPS signals with at least two GPS receivers, where each GPS receiver of the at least two GPS receivers is in signal communication with a corresponding antenna of the at least two antennas, and producing GPS measurements and quality indicator information from the received plurality of GPS signals. The method also may include determining the location for the GPS Mobile Unit utilizing the GPS measurements and quality indicator information.

Alternatively, the GPS Mobile Unit may include at least two antennas, at least two GPS front-ends, a parallel digital signal acquisition and tracking module in signal communication with the at least two GPS front-ends, and a position solution module in signal communication with the parallel digital signal acquisition and tracking module. The parallel digital signal acquisition and tracking module may be configured to receive digital GPS signals from the at least two GPS front-ends and, in response, produce GPS measurements and quality indicators, and wherein the position solution module may be configured to receive GPS measurements and quality indicators from the parallel digital signal acquisition and tracking module and, in response, determine a GPS location for the GPS Mobile Unit.

As an example of operation of this alternative, the GPS Mobile Unit may perform a method for receiving a plurality of GPS signals, at the GPS Mobile Unit, from a plurality of GPS satellite utilizing at least two antennas and, in response, determining a location for the GPS Mobile Unit. The method may include receiving the plurality of GPS signals with at least two GPS front-ends, wherein each GPS front-end of the at least two GPS front-ends is in signal communication with a corresponding antenna of the at least two antennas, and producing GPS measurements and quality indicator information from the received plurality of GPS signals. The method also may include determining the location for the GPS Mobile Unit utilizing the GPS measurements and quality indicator information.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

In general, the invention is a GPS Mobile Unit including at least two antennas and two GPS receivers and a position solution module in signal communication with the at least two GPS receivers, where signal communication refers to any type of communication and/or connection between the mobile stations that allows a given mobile station to pass and/or receive signals and/or information from another mobile station.

The communication and/or connection may be along any signal path between the mobile stations that allows signals and/or information to pass from one mobile station to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one device to another in varying digital formats without passing through a direct electromagnetic connection.

The position solution module is configured to receive GPS measurements and quality indicators from the at least two GPS receivers and, in response, determine a GPS location for the GPS Mobile Unit.

Figure 1:
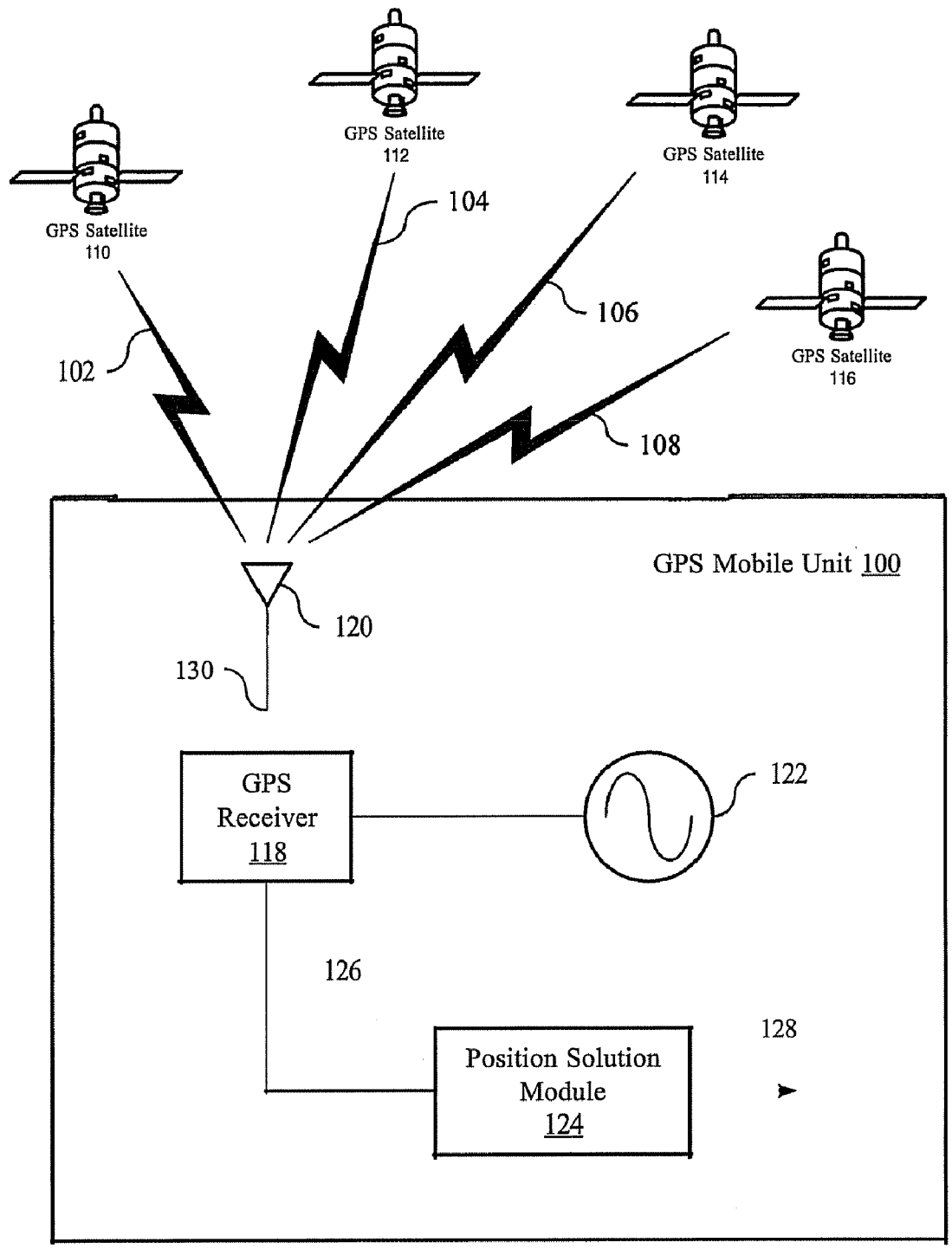
FIG. 1 is a block diagram of an example of a known GPS Mobile Unit that is capable of receiving GPS signals from a plurality of GPS satellites in a clear view environment.
Figure 2:
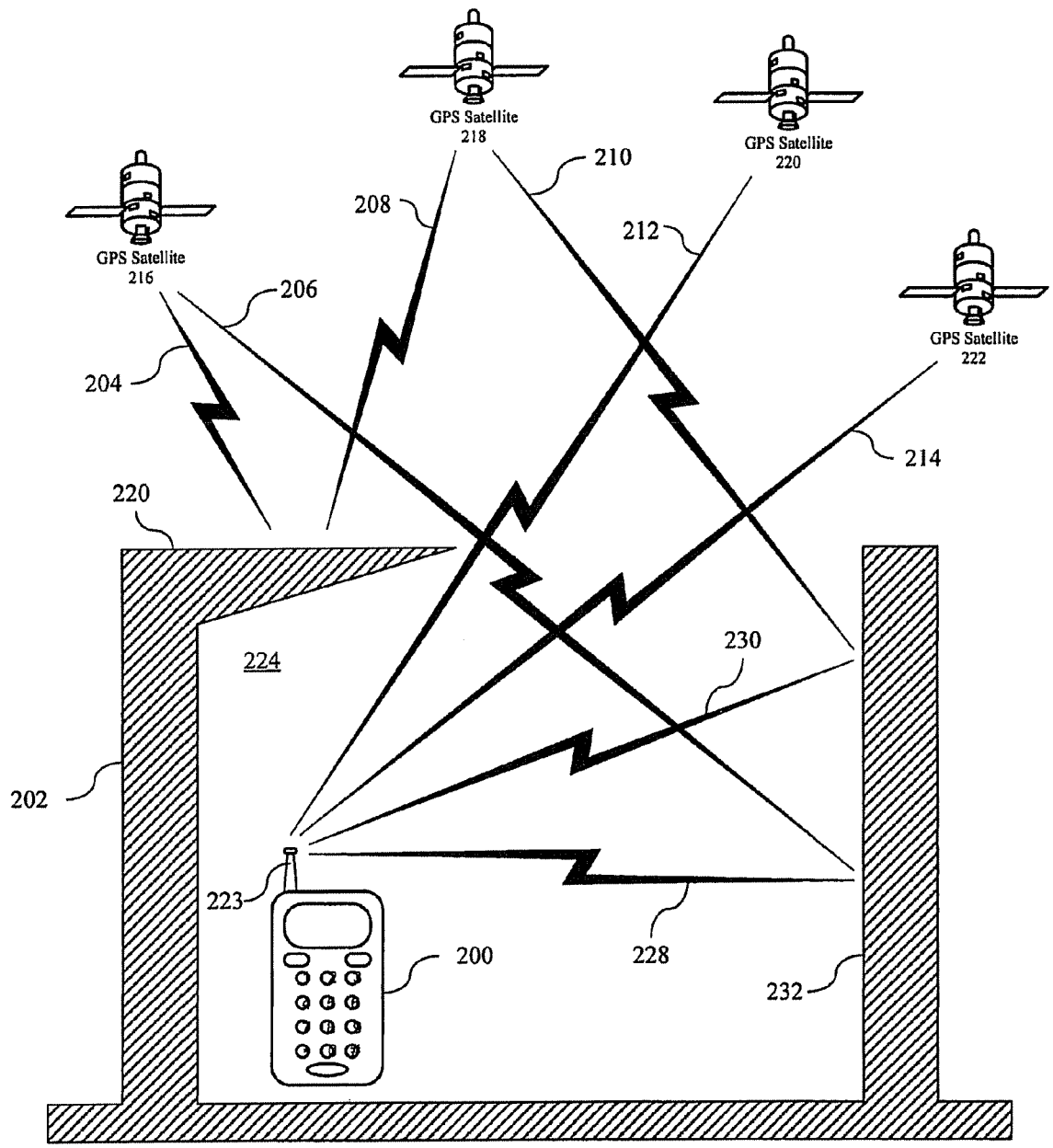
FIG. 2 is a system diagram of a GPS Mobile Unit in a multi-path environment with blockage.
Figure 3:
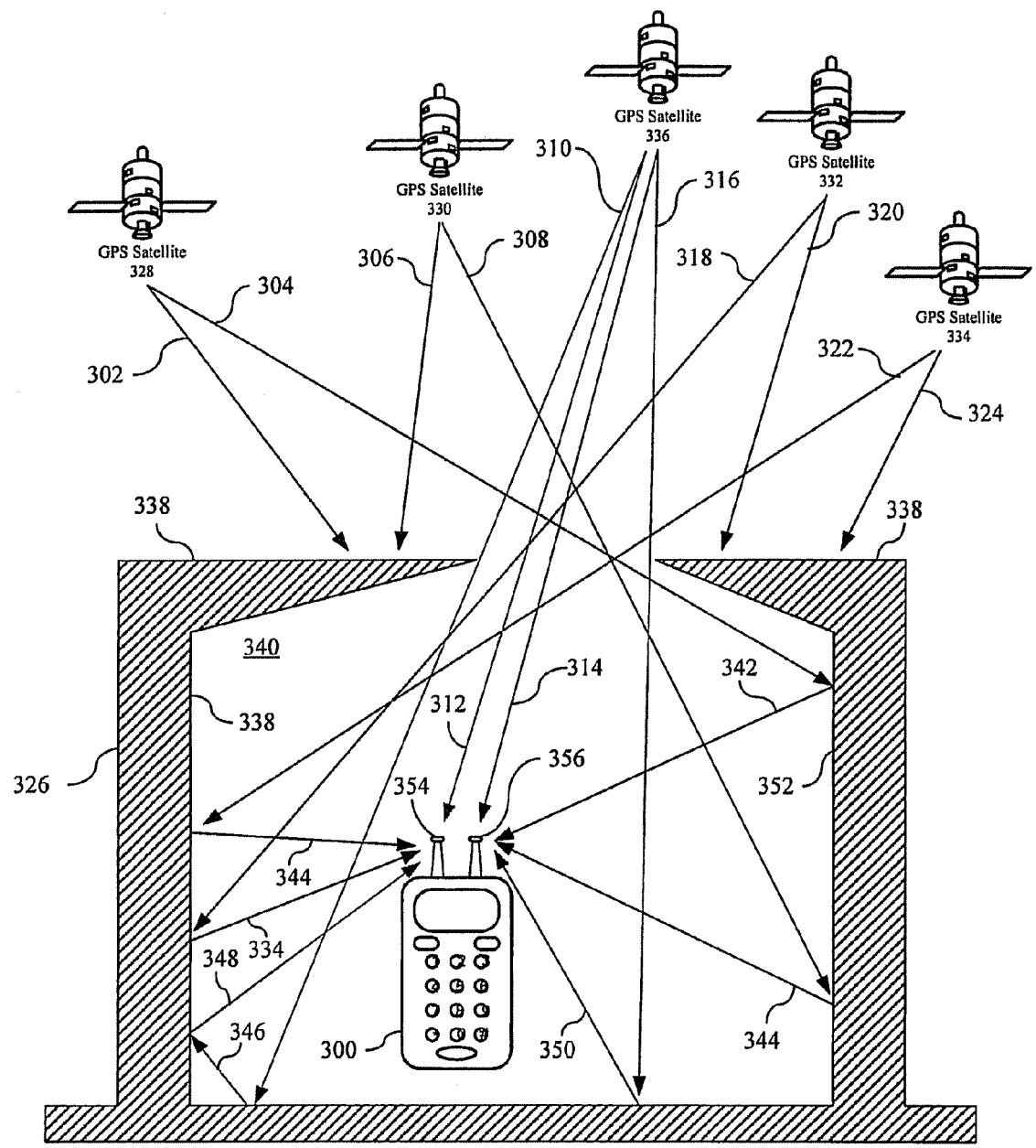
FIG. 3 shows a system diagram of a GPS Mobile Unit in a GPS propagation environment where the received GPS signals may be weak and blocked, and short-delay, strong interfering multi-path is dominant.

As an example similar to FIG. 2, FIG. 3 shows a system diagram of a GPS Mobile Unit 300 in a GPS propagation environment where the received GPS signals 304, 306, 308, 310, 312, 314, 316, 318, 320, 322, and 324 may be weak and blocked, and short-delay, strong interfering multi-path is dominant. In this example, the GPS Mobile Unit 300 may be located within structure 326 that blocks many of the GPS signals 302, 306, 320, and 324 from GPS satellites 328, 330, 332, and 334, respectively, to the GPS Mobile Unit 300 while allowing the potential reception of weak GPS signals 304, 308, 310, 312, 314, 316, 318, and 322 from GPS satellites 328, 330, 332, 334, and 336. Since GPS navigation systems typically consist of GPS satellite constellations that allow between 10 to 15 satellites to be above the horizon at any particular time, GPS satellites 328, 330, 332, 334, and 336 represent multiple GPS satellites that produce a plurality of weak GPS signals 304, 308, 310, 312, 314, 316, 318, and 322 that may be difficult to receive when combined with any multi-path GPS signals. The structure 326, as an example, may be a building, natural or man-made environmental structure (such as a canyon wall or street in a city with tall building).

Specifically in this example, GPS signals 302, 306, 320, and 324 are blocked by part 338 of the structure 326 while GPS signals 304, 308, 310, 312, 314, 316, 318, and 322 are passed into the interior 340 of the structure 326. However, in this example, none of the blocked GPS signals 302, 306, 320, and 324 are directly received by GPS Mobile Unit 300. Only weak GPS signals 312 and 314 are directly received by the GPS Mobile Unit 300 while GPS signals 304, 308, 310, 316, 318, and 322 are indirectly received by the GPS Mobile Unit 300 via multi-path GPS signals 342, 344, 346, 348, and 350, respectively, that may be reflected off of an inside walls 352 of the structure 326. Unlike FIG. 2, in FIG. 3, the GPS Mobile Unit 300 includes a plurality of antennas, which, in this example, are shown as at least two antennas 354 and 356.

In this example, each antenna 354 or 356 may receive a GPS signal from an individual GPS satellite that the other antenna may not such as, for example, antenna 354 receiving GPS signals from GPS satellites 332 and 334 while antenna 356 receives GPS signals from GPS satellites 328 and 330. However both antennas 354 and 356 are also capable of receiving GPS signals from the same GPS satellite such as, for example, antenna 354 receiving GPS signals 310 and 312 and antenna 356 receiving GPS signals 314 and 316 from GPS satellite 336. It is appreciated by those skilled in the art that in case of both antennas 354 and 356 receiving GPS signals from the same GPS satellite, both antennas 354 and 356 will have different antenna reception. The difference in antenna reception is due to each antenna 354 and 356 receiving more than one signal path from each of the GPS satellites, which may lead to constructive or destructive multi-path interference for a given antenna. In this example, antenna 356 may receive a "good" net GPS signal from the combination of the first signal path of GPS signal 314 and second signal path of multi-path GPS signals 316 and 350, while antenna 354 may not be able to receive a good net GPS signal because the combination of the first signal path of GPS signal 312 and second signal path of multi-path GPS signals 310, 346, and 348 may produce a spatial signal null at the location of the antenna 354 due to slightly different and unfavorable phasing of path lengths. As such, by having two or more antennas 354 and 356, the GPS Mobile Unit 300 improves the probability that at least one of the antennas 354 or 356 will observe constructive interference and hence the signal power received will be equal to, or greater than, the acquisition and tracking sensitivity of the GPS receiver in the GPS Mobile Unit 300.

As an example, the two antennas 354 and 356 may be spaced a distance that is optionally approximately a quarter of a wavelength apart to provide spatial diversity observations in the GPS Mobile Unit 300. For an example, utilizing the L1 GPS channel (that has a wavelength of approximately 19 cm), the two antennas 354 and 356 may be spaced a distance that is approximately 4.8 cm apart. However, configuring the two antennas 354 and 356 with either a shorter or longer distance spacing that a quarter of a wavelength between the two antennas 354 and 356 is also possible and within the scope of this invention. Generally, a wider distance spacing between the two antennas 354 and 356 exhibits improved spatial de-correlation by creating multi-path independence between the two antennas 354 and 356.

Additionally, or in combination with space diversity, one antenna 354 or 356 may have a different orientation than the other antenna. In this example, the two antennas 354 and 356 are not omni-directional, therefore allowing a situation were the second antenna is capable of receiving signals (or receiving better signals) from a multi-path direction where the first antenna has poor spatial sensitivity. In practice, GPS antennas generally do not receive GPS signals from all directions equally well; however, in the case where two omni-directional antennas are utilized, the same effect may be achieved by a physical placement of the antennas 354 or 356 that partially or completely shields one antenna from the other.

As an example of operation, since multi-path GPS signals are radio waves that undergo the phenomenon of diffraction and may be either constructive or destructive in terms of signal amplitude, it is probable that one of the antennas (for example antenna 354) will observe GPS signals from individual satellites that are not strong enough to be acquired or tracked, while the other antenna (for example antenna 356) successfully receives the GPS signals from the same satellites. These received GPS signals are then passed to separate GPS receiver front-ends (not shown) that process the respective GPS signals to produce satellite measurement data and quality indicators information which may be utilized to determine the GPS location of the GPS Mobile Unit 300.

Figure 4:
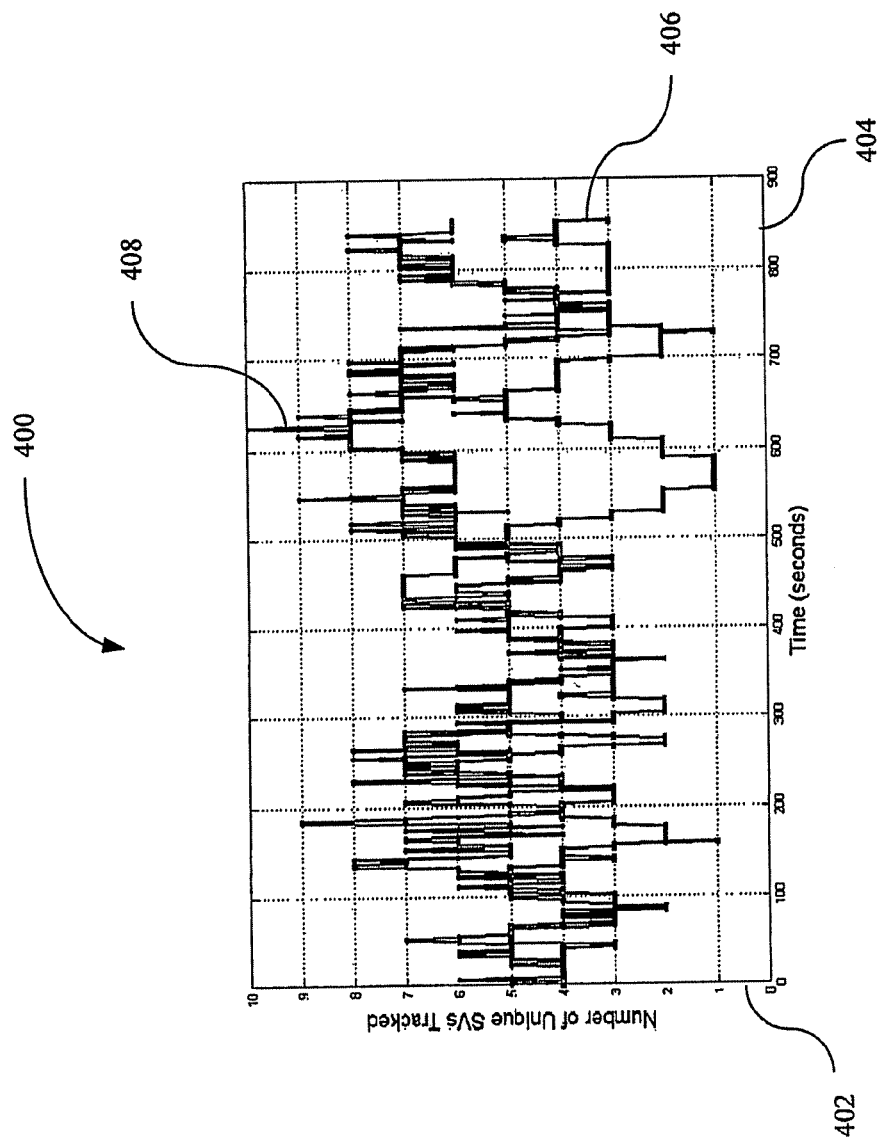
FIG. 4 shows a graphical representation of an example plot of the number of satellites tracked versus time (in seconds) by the first antenna and second antenna (shown in FIG. 3) for a deep indoor environment.

As an example, FIG. 4 shows a graphical representation of an example plot 400 of the number of satellites tracked 402 versus time (in seconds) 404 by the first antenna 340 and second antenna 342 (shown in FIG. 3) for a deep indoor environment where space diversity is employed. In this example, it is appreciated by those skilled in the art that the observed number of satellites tracked by each antenna (340 and 342) varies substantially with time, which indicates that the GPS Mobile Unit 300 is in an environment that has substantial multi-path and signal blockage. Plot trace 406 represents the number of satellites tracked by the first antenna 340 while plot trace 408 represents the number of satellites tracked by the second antenna 342.

Figure 5:
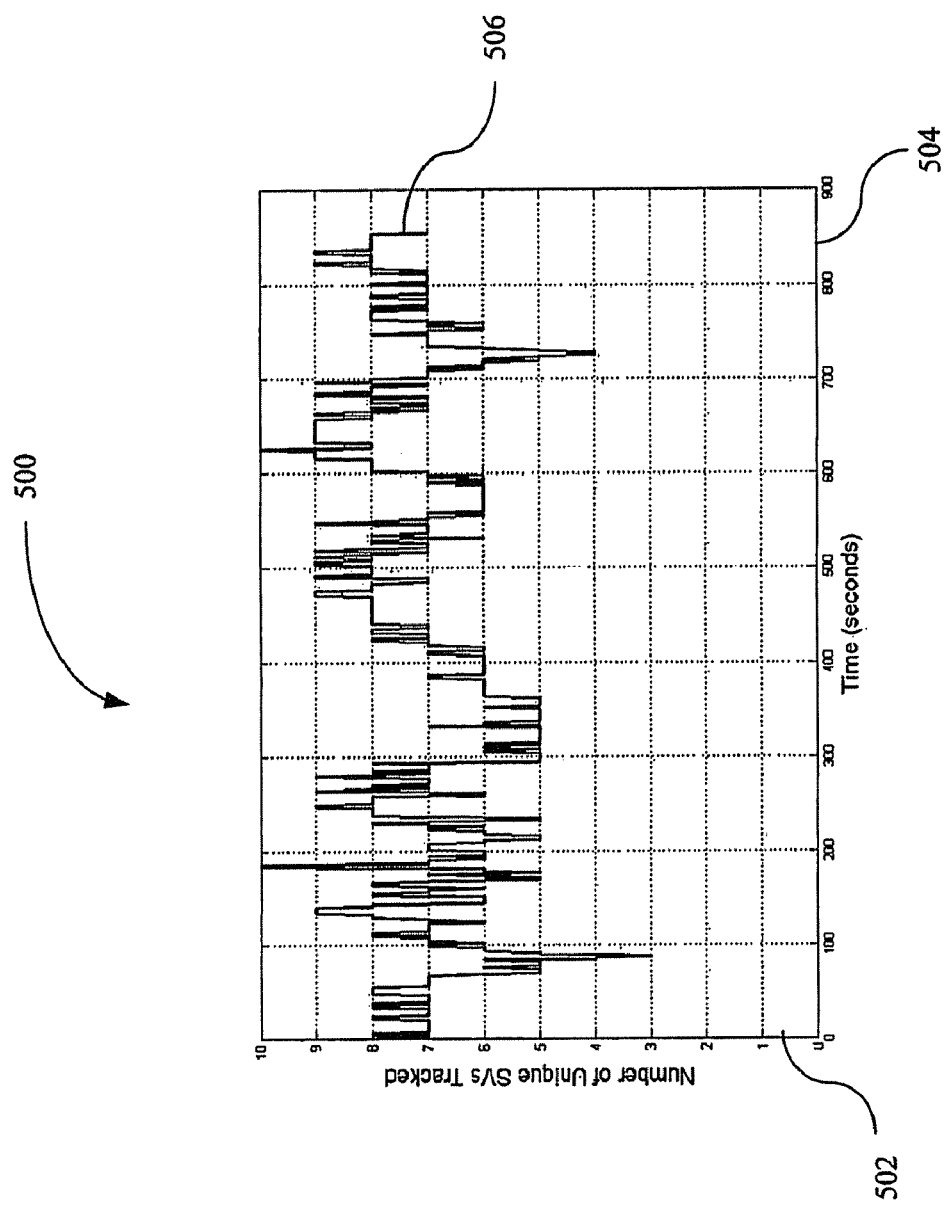
FIG. 5 shows a graphical representation of an example plot of the combined number of unique satellites tracked versus time (in seconds) by both antennas for the same environment as shown in FIG. 4

In FIG. 5, a graphical representation of an example plot 500 of the combined number of unique satellites tracked 502 versus time (in seconds) 504 by both antennas 340 and 342 for the same environment as in FIG. 4. It is appreciated that the combined number of satellites received by the two antennas 340 and 342 allows continuous navigation compared to using each antenna individually which would fail to allow continuous navigation.

Figure 6:
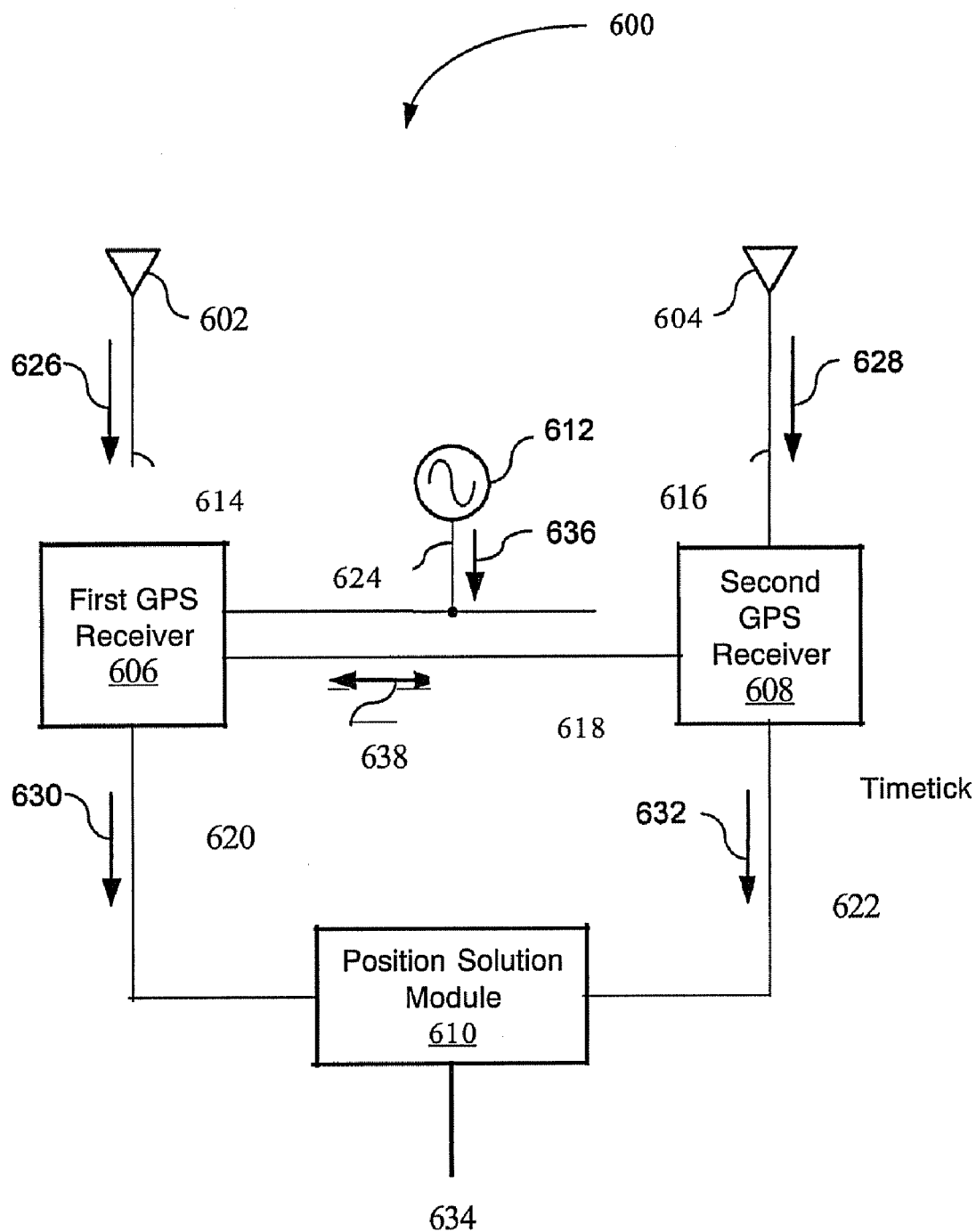
FIG. 6 is a block diagram of an example of an implementation of GPS Mobile Unit.

In FIG. 6, an example of an implementation of GPS Mobile Unit 600 is shown. The GPS Mobile Unit 600 may include two antennas (first antenna 602 and second antenna 604), two GPS receivers (first GPS receiver 606 and second GPS receiver 608), a Position Solution Module 610, and a common frequency source 612. The first antenna 602 may be in signal communication with the first GPS receiver 606 via signal path 614 and second antenna 604 may be in signal communication with the second GPS receiver 608 via signal path 616. The first GPS receiver 606 may be in signal communication with the second GPS receiver 608 via signal path 618. The Position Solution Module 610 may be in signal communication with both the first GPS receiver 606 and the second GPS receiver 608 via signal paths 620 and 622, respectively. The common frequency source 612 also may be in signal communication with both the first GPS receiver 606 and the second GPS receiver 608 via signal path 624.

The first and second GPS receivers 606 and 608 may be any GPS engine configured to receive GPS signals 626 and 628 from the first and second antennas 602 and 604, respectively. As an example, the GPS receivers 606 and 608 may be GPS engines capable of receiving GPS signals 626 and 628 and producing outputs signals 630 and 632, respectively, which include satellite measurement and quality indicator information that is passed to the Position Solution Module 610. The satellite measurement and quality indicator information may include pseudo-range, timing, Doppler, signal-to-noise ratio ("SNR"), carrier-to-noise ratio ("CNO"), signal strength measurements, cross-correlation (i.e., interference caused when receiving a weak GPS signal in the presence of a strong GPS signal), multi-path detector information, satellite heath indication information, data decode indicator, detected navigation message bits, signal jamming indication information, etc.

The two antennas 602 and 604 may be optionally omni-directional types of antennas that have performance that is less dependent on the orientation of the antennas 602 and 604 or they may be directional antennas. In case of directional antennas, the two antennas 602 and 604, for example, may be microstrip (i.e., patch) antennas.

As an example, if the two antennas 602 and 604 are differently oriented within the user package, the two antennas 602 and 604 may improve the GPS Mobile Unit 600 net spatial radiation pattern to avoid the loss which would occur when the orientation of one antenna is far from optimal. As a result, the reception of the most desirable direct non-multi-path signals (i.e., weak GPS signals), when available, may be more tolerant of the orientation of the antennas 602 and 604, and consequently the GPS Mobile Unit 600 is easier for a user to operate for best results.

Alternatively, if the two antennas 602 and 604 omni-directional antennas, the two antennas 602 and 604 may be advantageous for indoor reception because the two antennas 602 and 604 are capable of receiving GPS signals from any direction and indoors may be where the GPS Mobile Unit 600 is mostly reliant on multi-path GPS signal that have bounced off at least one object in the indoor environment.

Another advantage of GPS Mobile Unit 600 is that when the number of GPS signals is minimal, the solution accuracy may sometimes be dominated by poor geometry of the received GPS satellites. The ability to see a multi-path GPS signal when no direct GPS signal path is available will sometimes give an improved answer from better GPS satellite geometry even though the additional GPS signal is a reflection, as long as the path differential delay is not too large. Generally, when one antenna receives a GPS signal from a navigation required GPS satellite and the other antenna does not, then a resulting solution with some multi-path error is better than no solution.

In general, the large number of potential observations improves the chances that either antenna 602 and 604 will be able to observe several GPS satellites. As an example, assuming a three-dimensional position fix requires four GPS satellites to be successfully received, antenna 602 may be in an environment where only two GPS satellites can be successfully received. However, in this situation, there is a good probability that antenna 604 will receive two or more GPS satellites other than the ones received by antenna 602. As a result, this example allows a position fix to be available with the GPS Mobile Unit 600.

The Position Solution Module 610 is a device, component, or module that is capable of receiving the satellite measurement and quality indicator information from both the first and second GPS receivers 606 and 608 and, in response, determines a location 634 for the GPS Mobile Unit 600. As an example, the satellite measurement and quality indicator information can be used to further enhance the position fix accuracy of the GPS Mobile Unit 600 when the two antennas 602 and 604 successfully receive a particular satellite.

As an example, the Position Solution Module 610 may utilize the satellite measurement and quality indicator information in a number of methods to optimize the solution. As an example, one method may select the measurements from a particular GPS satellite that has the greatest SNR while other methods may utilize other parameters to make determinations based on the other indicators.

As another example, if both GPS receivers 606 and 608 detect a GPS satellite, but the pseudo-ranges are slightly different, then the earlier GPS signal has less multi-path delay, or perhaps is a direct GPS signal, and the later pseudo-ranges may be less desirable in the position solution, so the Position Solution Module 610 may discard the later pseudo-ranges and only use the earlier one for position solution.

In yet another example, if a GPS signal is successfully received on both antennas 602 and 604 but the GPS receiver 606 for antenna 602 indicates that the CNO is approximately 5 dB greater than antenna 604 then it is advantageous for the Position Solution Module 610 to use only the measurement from antenna 602 in the GPS position solution. This is because the pseudo-range measurement noise is typically less for higher CNOs, tracking loops are generally more likely to hold onto signal with higher CNO under dynamic conditions (e.g. the motion of cell phone as a user moves), and higher CNO signals are less generally prone to cross-correlation interference.

In still another example, if the two antennas 602 and 604 observe similar CNOs but one GPS receiver (either 606 or 608) indicates the presence of severe multi-path distortion (such as distortion of the correlation function from its nominal shape), then the Position Solution Module 610 may utilize the measurement that does not indicate severe multi-path. In addition if one antenna (either 602 or 604) sees a higher CNO GPS signal but it is significantly delayed with respect to the GPS signal received in the other antenna then the Position Solution Module 610 may utilize the range measurement from the lower CNO GPS signal antenna that is less delayed (in time).

In yet another example, if the two antennas 602 and 604 are capable of tracking the same GPS satellite the data decoding operation may be enhanced by selecting on a bit by bit basis (such as, for example, every 20 msecs) the highest power GPS signal. In addition, if the CNOs of the detected GPS signals are close between the two antennas 602 and 604 it may be advantageous to add the two 20 msec correlation outputs together before making a data bit decision.

The common frequency source 612 may be a Temperature Compensated Crystal Oscillator ("TXCO") which produces a frequency reference and timing signal 636 that is feed to both the first GPS receiver 606 and second GPS receiver 608. Additionally, the first GPS receiver 606 may send a time mark signal 638 to the second GPS receiver 608 via signal path 618. The timing signal 636 and time mark signal 638 allow both GPS receivers 606 and 608 to have the same knowledge of time which allows a three-dimensional position solution for the GPS Mobile Unit 600 to be determined utilizing four GPS satellites by calculating the X, Y, Z, and local time offset for the GPS Mobile Unit 600 with the Position Solution Module 610. Generally, the GPS receivers 606 and 608 may assist each other in detecting, acquiring, and tracking GPS signals in various ways including, for example, utilizing detected navigation bits, pseudo-ranges of acquired GPS satellites, etc.

As an example, if GPS receiver 606 detects a GPS satellite then it could send, via time mark signal 638, GPS receiver 608 what the ID and pseudo-range values were for the detected GPS satellite, and GPS receiver 608 could use that information to detect other GPS satellites faster.

The time mark signal 638 is typically produced by forming a counter clock using the output of the TCXO (e.g. a certain number of TCXO cycles represents a millisecond, a 1000 of these represents a second, 86400 of these represents a week etc.). Generally, the measurement times between the two antennas 602 and 604 do not have to be identical but they have to be known with respect to each other, otherwise an additional GPS satellite may be required in the position solution to compute the unknown time offset.

Figure 7:
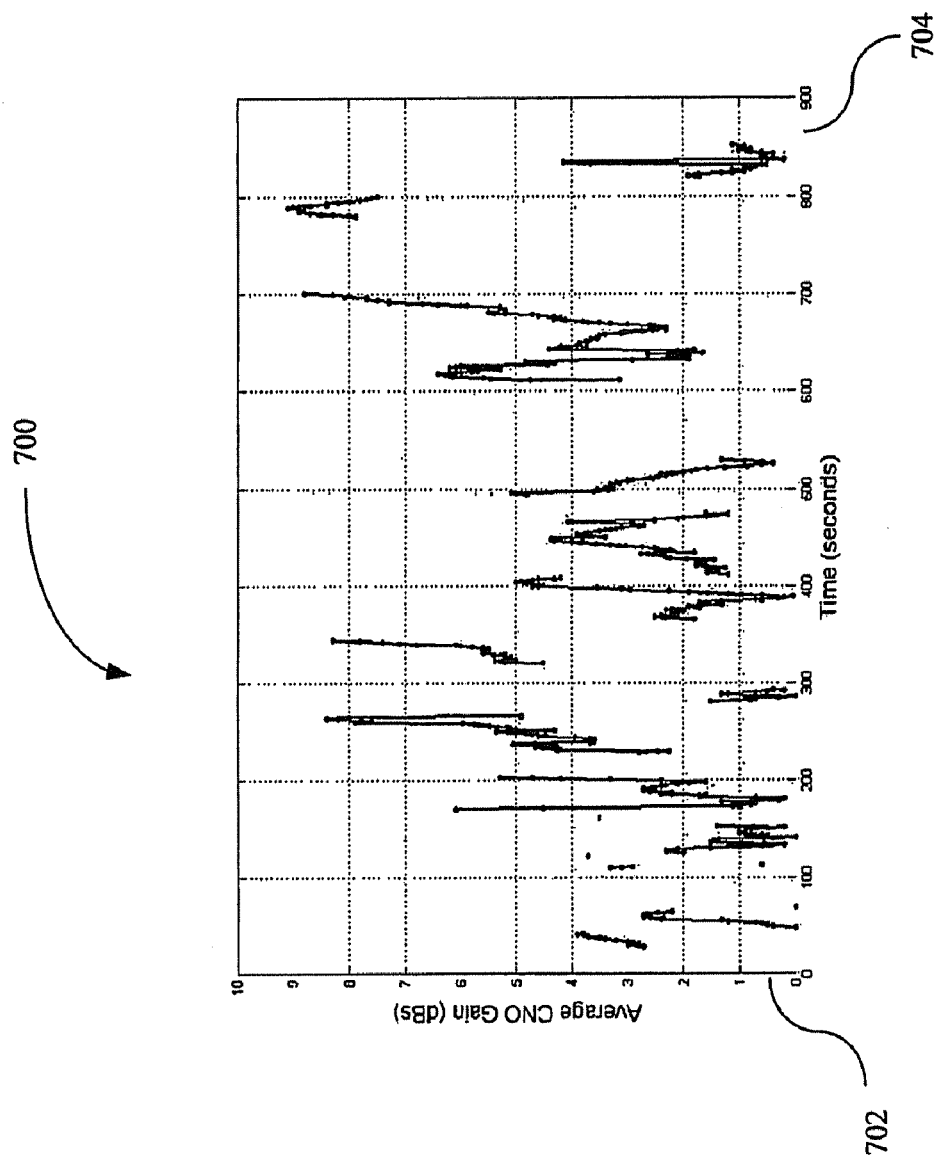
FIG. 7 is a graphical representation of an example plot of the average CNO gain versus time (in seconds) for both antennas tracking the same GPS satellite.

In FIG. 7, a graphical representation of an example plot 700 of the average (each second) CNO gain 702 versus time (in seconds) 704 for both antennas 602 and 604 (and as a result GPS receivers 606 and 608 in FIG. 6) tracking the same GPS satellite. FIG. 7 shows an example where both GPS receivers 606 and 608 successfully receive a GPS signal form the same GPS satellite. In general, the plot 700 illustrates how the combined signal strength of GPS satellites from two antennas in a multi-path environment is stronger than the signal strength from only one antenna in a multi-path environment. The plot 700 also shows that the two antennas generally observe significantly different CNOs and that by having two antennas GPS Mobile Unit has the capability of benefiting from this difference by selecting the higher CNO signal for position fixing. The plot 700 also illustrates that in this example, having two antennas on average results in approximately 4.5 dB improvement over one antenna.

Figure 8:
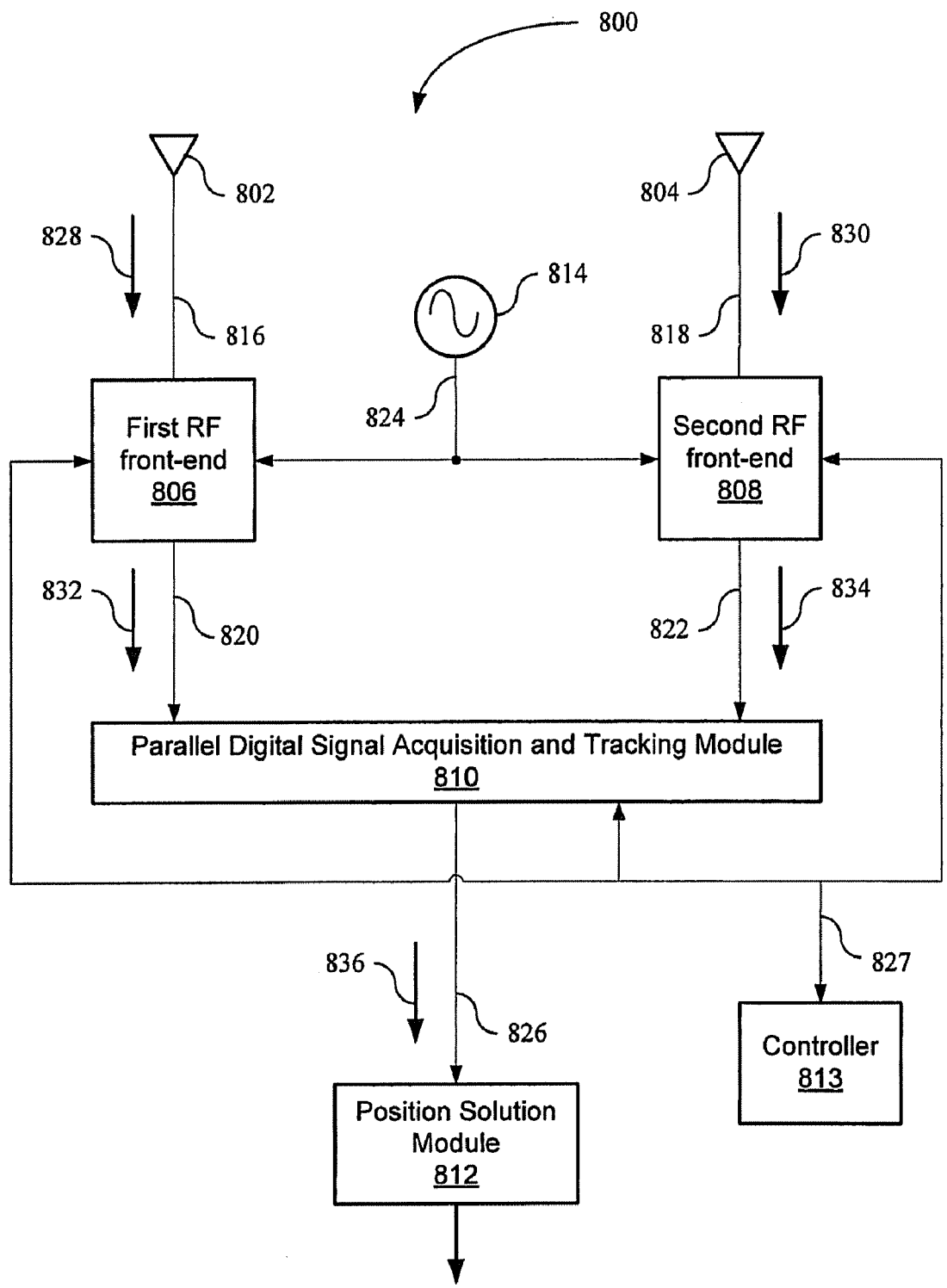
FIG. 8 is a block diagram of an example of another implementation of GPS Mobile Unit.

In FIG. 8, an example of another implementation of GPS Mobile Unit 800 is shown. The GPS Mobile Unit 800 may include two antennas (first antenna 802 and second antenna 804), two GPS radio frequency ("RF") receivers front-end (first RF front-end 806 and second RF front-end 808), a Parallel Digital Signal Acquisition and Tracking Module 810, Position Solution Module 812, Controller 813, and a common frequency source 814. The first antenna 802 may be in signal communication with the first RF front-end 806 via signal path 816 and second antenna 804 may be in signal communication with the second RF front-end 808 via signal path 818. The Parallel Digital Signal Acquisition and Tracking Module 810 may be in signal communication with both the first RF front-end 806 and the second RF front-end 808 via signal paths 820 and 822, respectively. The common frequency source 814 also may be in signal communication with both the first RF front-end 806 and the second RF front-end 808 via signal path 824. The Position Solution Module 812 may be in signal communication with the Parallel Digital Signal Acquisition and Tracking Module 810 via signal path 826. The Controller 813 may be in signal communication with the first RF front-end 806, second RF front-end 808, and Parallel Digital Signal Acquisition and Tracking Module 810 via signal path 827.

The first and second RF front-ends 806 and 808 may be a radio front-end configured to receive GPS signals 828 and 830 from the first and second antennas 802 and 804, respectively. As an example, the RF front-ends 806 and 808 may be devices, components, or modules capable of receiving GPS signals 828 and 830, removing the GPS carrier signals, and producing digital outputs signals 832 and 834, respectively, which are intermediate frequency ("IF") or baseband N-quantized GPS signals 832 and 834 that are passed to the Parallel Digital Signal Acquisition and Tracking Module 810 via signal paths 820 and 822.

The Parallel Digital Signal Acquisition and Tracking Module 810 receives the N-quantized GPS signals 832 and 834 and, in response, produces satellite measurement and quality indicator information 836 that is passed to the Position Solution Module 810. Again, the satellite measurement and quality indicator information may include pseudo-range, timing, Doppler, SNR, CNO, signal strength measurements, cross-correlation, multi-path detector information, satellite heath indication information, data decode indicator, detected navigation message bits, signal jamming indication information, etc.

Similar to the example shown in FIG. 6, the Position Solution Module 810 is a device, component, or module that is capable of receiving the satellite measurement and quality indicator information from Parallel Digital Signal Acquisition and Tracking Module 810 and, in response, determine a location 634 for the GPS Mobile Unit 800. However, unlike the example shown in FIG. 6, the GPS Mobile Unit 800 includes the Parallel Digital Signal Acquisition and Tracking Module 810 as a single digital section, component, device, or module. In this way if the GPS Mobile Unit 800 is designed to utilize M GPS satellite acquisition channels, the Controller 813 may be utilized to set up the M possible GPS satellite acquisition channels. This allows a equal number of GPS satellite acquisition channels to be used to observe a GPS satellite on each antenna, or an increased number of GPS satellite acquisition channels applied to an antenna that has shown a history of improved satellite tracking (i.e. for static applications). The Controller 813 may be a controller device, microcontroller, processor, microprocessor, application specific integrated circuit ("ASIC"), digital signal processor ("DSP"), or other similar device. The Controller 813 may also optionally be part of the Parallel Digital Signal Acquisition and Tracking Module 810 or Position Solution Module 812.

Figure 9:
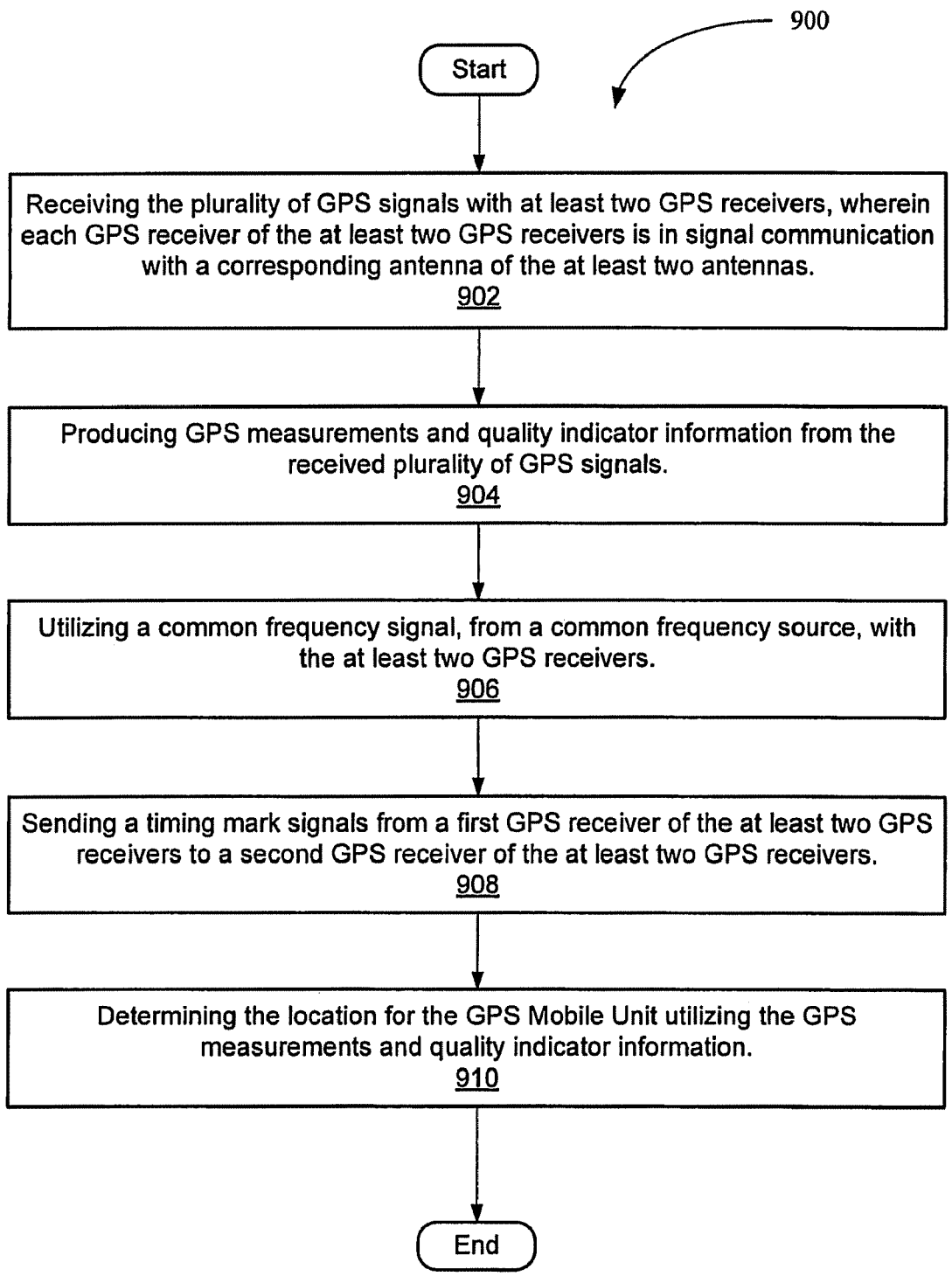
FIG. 9 is a flowchart illustrating a process that is an example of the general operation of the GPS Mobile Unit shown in FIG. 6.

In FIG. 9, a flowchart 900 is shown that illustrates an example process performed by the GPS Mobile Unit 600 of FIG. 6. The process begins in step 902 where the GPS Mobile Unit 600 receives a plurality of GPS signals with at least two GPS receivers, where each GPS receiver of the at least two GPS receivers is in signal communication with a corresponding antenna of the at least two antennas. In step 904, the GPS Mobile Unit 600 produces GPS measurements and quality indicator information from the received plurality of GPS signals. In step 906, the GPS Mobile Unit 600 utilizes a common frequency signal, from a common frequency source, with the at least two GPS receivers and, in step 908, sends a timing mark signals from a first GPS receiver of the at least two GPS receivers to a second GPS receiver of the at least two GPS receivers. The GPS Mobile Unit 600 then, in step 910, determines the location for the GPS Mobile Unit utilizing the GPS measurements and quality indicator information and the process ends.

Figure 10:
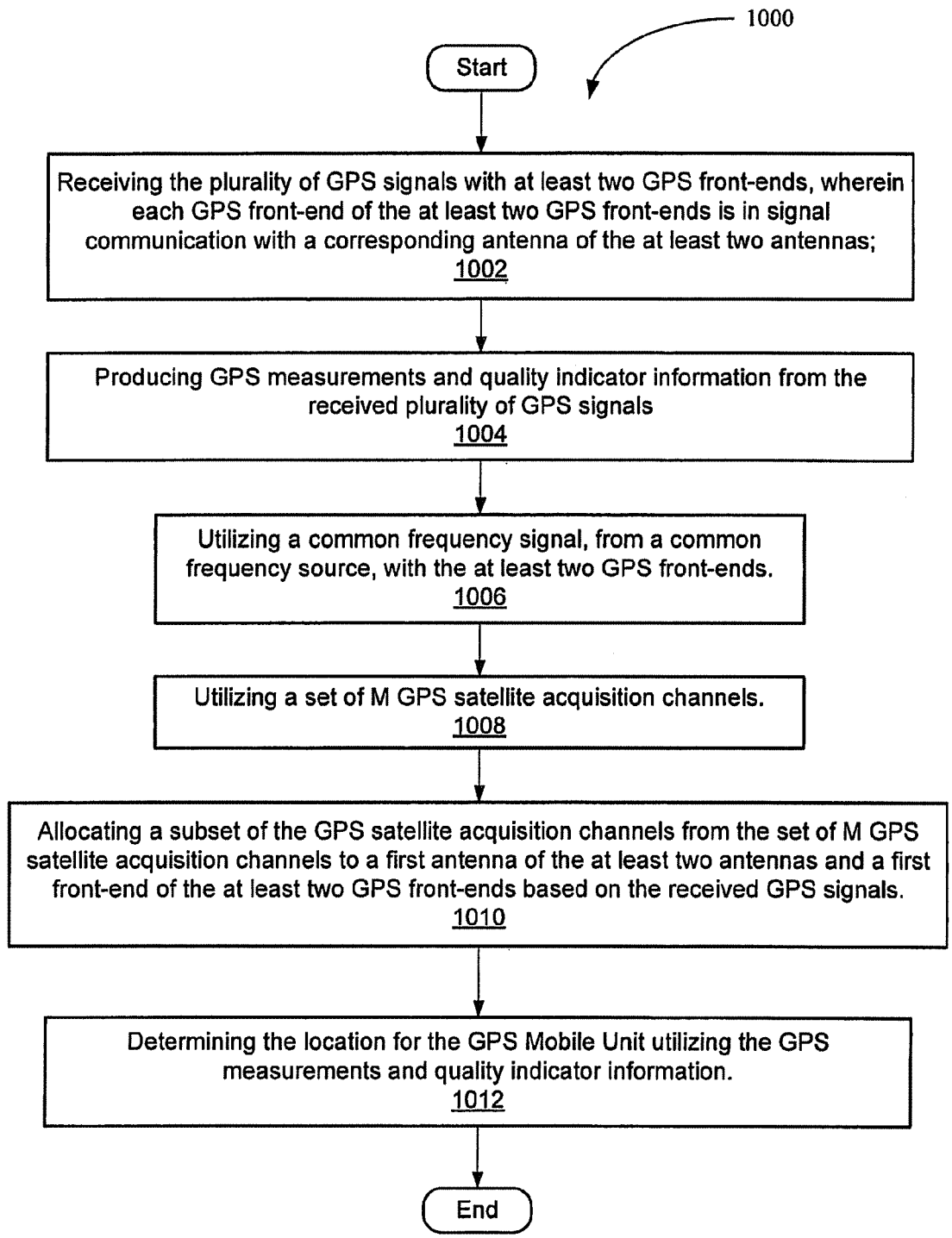
FIG. 10 is a flowchart illustrating a process that is an example of the general operation of the GPS Mobile Unit shown in FIG. 8.

In FIG. 10, a flowchart 1000 is shown that illustrates an example process performed by the GPS Mobile Unit 800 of FIG. 8. The process begins in step 1002 where the GPS Mobile Unit 800 receives the plurality of GPS signals with at least two GPS front-ends, where each GPS front-end of the at least two GPS front-ends is in signal communication with a corresponding antenna of the at least two antennas. In step 1004, the GPS Mobile Unit 800 produces GPS measurements and quality indicator information from the received plurality of GPS signals. In step 1006, the GPS Mobile Unit 800 utilizes a common frequency signal, from a common frequency source, with the at least two GPS receivers and, in step 1008, the GPS Mobile Unit 800 utilizes a set of M GPS satellite acquisition channels. In step 1010, the GPS Mobile Unit 800 allocates a subset of the GPS satellite acquisition channels from the set of M GPS satellite acquisition channels to a first antenna of the at least two antennas and a first front-end of the at least two GPS front-ends based on the received GPS signals. The GPS Mobile Unit 800 then, in step 1010, determines the location for the GPS Mobile Unit utilizing the GPS measurements and quality indicator information and the process ends.

Figure 11:
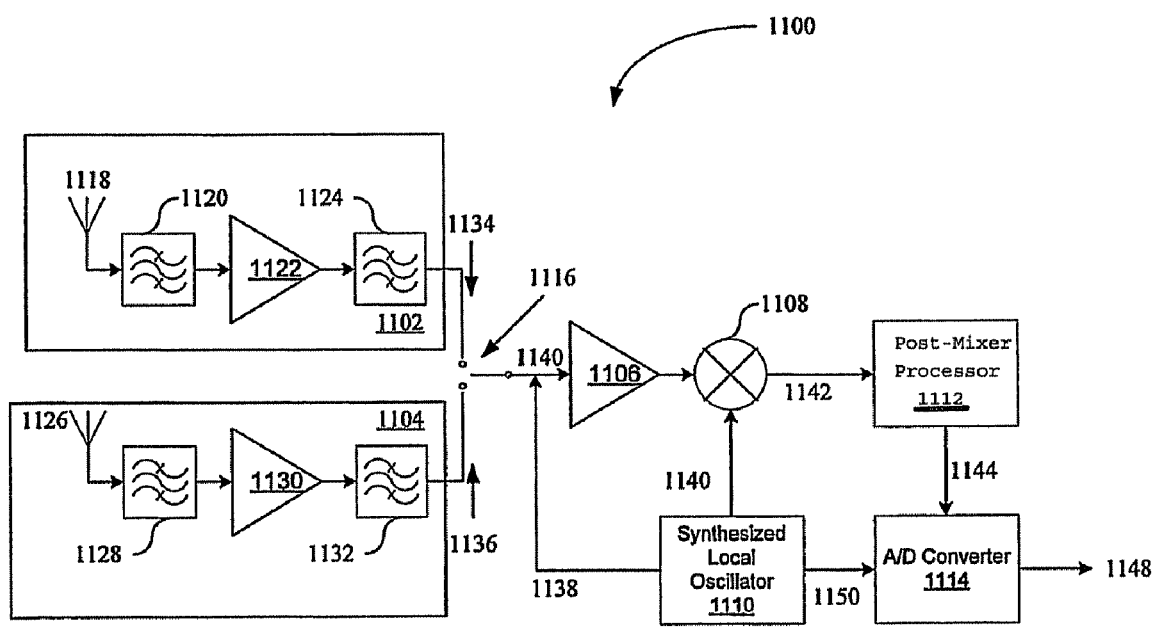
FIG. 11 is a block diagram of an example of another implementation of GPS Mobile Unit utilizing a fast sequencing RF architecture.
Figure 9:
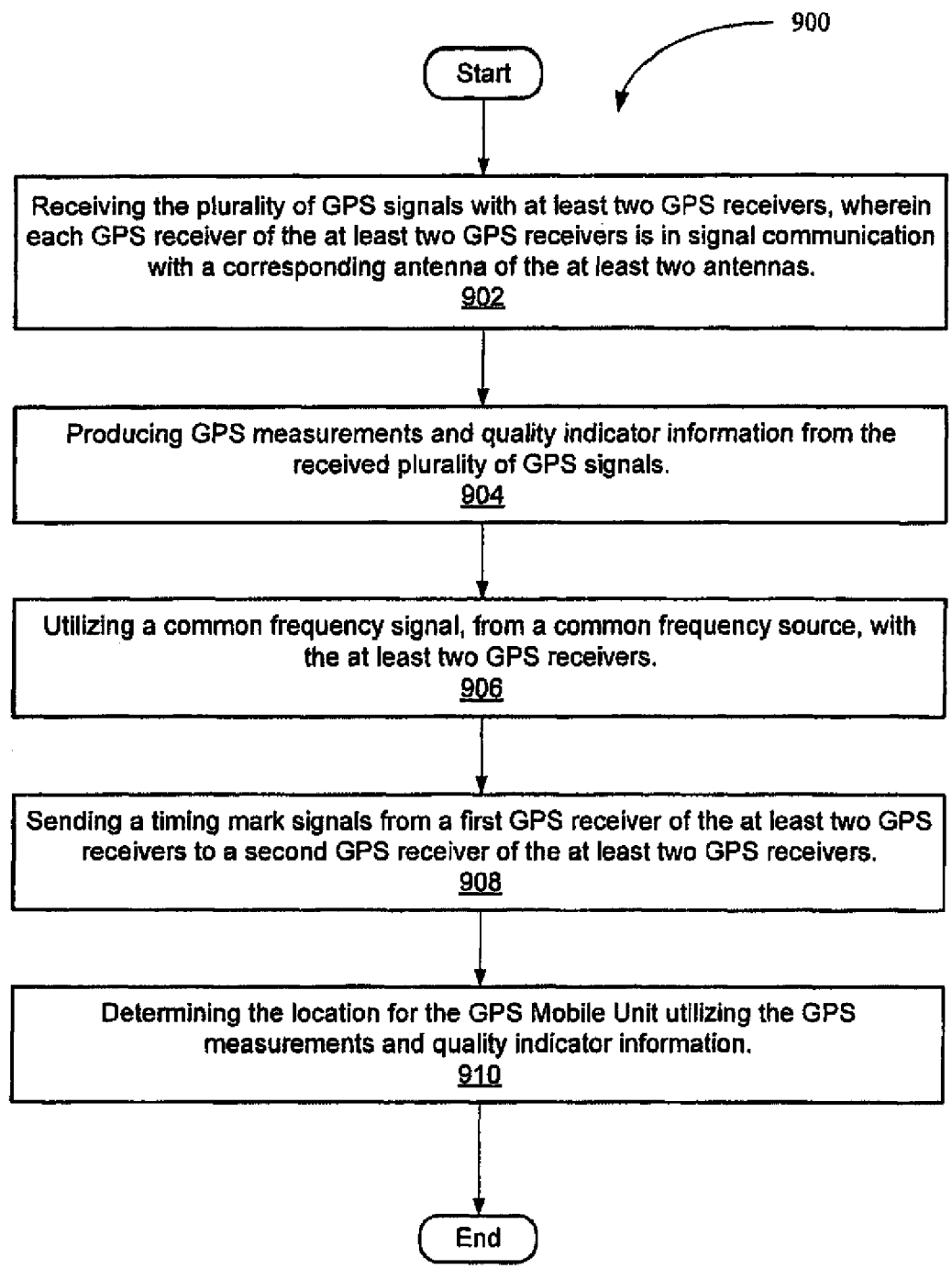

In FIG. 11, a block diagram of an example of another implementation of GPS Mobile Unit 1100 utilizing a fast sequencing RF architecture is shown. The GPS Mobile Unit 110 may include a first RF front-end 1102, second RF front-end 1104, pre-mixer amplifier 1106, mixer 1108, Synthesized Local Oscillator ("LO") 1110, Post-mixer processor module 1112, Analog-to-digital ("A/D" or "ADC") Converter 1114, and switch 1116. In this example, the Post-mixer processor module 1112 may include an IF filter, amplifier and automatic gain control ("AGC") modules (not shown). Additionally, the first RF front-end 1102 may include a first antenna 1118, first bandpass filter 1120, first amplifier 1122, and second bandpass filter 1124. Similarly, the second RF front-end 1104 may include a second antenna 1126, third bandpass filter 1128, second amplifier 1130, and fourth bandpass filter 1132.

In this example, both the first RF front-end 1102 and second RF front-end 1104 receive GPS signals via the first antenna 1118 and second antenna 1126 which are initially processed and sent to the pre-mixer amplifier 1106. However, in this example, the switch 1116 switches on alternative samples of the first front-end signal 1134 and second front-end signal 1136 produced by the first RF front-end 1102 and second RF front-end 1104, respectively. The switch 1116 switches based on a first clock signal 1138 produced by the Synthesized LO 1110. The resultant sampled signal 1140 is then passed to the pre-mixer amplifier 1106, which amplifies the sampled signal 1140 and passes it to the mixer 1108. The mixer 1108 mixes the sampled signal 1140 with the LO signal 1142 to produced a mixed signal 1144, which is passed to the Post-mixer processor module 1112. The Post-mixer processor module 1112 filters, amplifies, and adjusts the gain of the mixed signal 1144 and passes the processed signal 1146 to the ADC Converter 1114, which converts the processed signal 1146 to a digital output signal 1148, using a second clock signal 1150 from the synthesized LO 1110. The digital output signal 1148 is then passed to a DSP (not shown). In this example, the digital output signal 1148 represents the signal samples in alternative format where the alternative samples represent the sample from each channel (i.e., from either the first RF front-end 1102 and second RF front-end 1104.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A GPS Mobile Unit comprising:
   at least two antennas;
   at least two GPS receivers, wherein each GPS receiver of the at least two GPS receivers is in signal communication with an individual antenna of the at least two antennas;
   a position solution module in signal communication with the at least two GPS receivers, wherein the position solution module is configured to receive GPS measurements and quality indicators from the at least two GPS receivers and, in response, determine a GPS location for the GPS Mobile Unit; and
   a common frequency source in signal communication with each GPS receiver of the at least two GPS receivers.

2. The GPS Mobile Unit of claim 1, wherein the at least two antennas are spaced approximately a quarter of a wavelength apart.

3. The GPS Mobile Unit of claim 1, wherein a first GPS receiver of the at least two GPS receivers is configured to send a timing mark signal to a second GPS receiver of the at least two GPS receivers.

4. The GPS Mobile Unit of claim 3, wherein the common frequency source is a Temperature Compensated Crystal Oscillator ("TXCO").

5. The GPS Mobile Unit of claim 3, wherein each antenna, of the at least two antennas, has an antenna pattern that is not omni-directional.

6. The GPS Mobile Unit of claim 5, wherein each antenna is a patch antenna.

7. The GPS Mobile Unit of claim 1, wherein the at least two antennas have different orientations.

8. The GPS Mobile Unit of claim 1, wherein the satellite measurement and quality indicator information includes pseudorange, timing, Doppler, signal-to-noise ratio ("SNR"), carrier-to-noise ratio ("CNO"), signal strength measurements, multi-path detector information, satellite heath indication information, and signal jamming indication information.

9. A GPS Mobile Unit comprising:
   at least two antennas;
   at least two GPS front-ends, wherein each GPS front-end of the at least two GPS front-ends is in signal communication with each antenna of the at least two antennas;
   a parallel digital signal acquisition and tracking module in signal communication with the at least two GPS front-ends, wherein the parallel digital signal acquisition and tracking module is configured to receive digital GPS signals from the at least two GPS front-ends and, in response, produce GPS measurements and quality indicators; and
   a position solution module in signal communication with the parallel digital signal acquisition and tracking module, wherein the position solution module is configured to receive GPS measurements and quality indicators from the parallel digital signal acquisition and tracking module and, in response, determine a GPS location for the GPS Mobile Unit.

10. The GPS Mobile Unit of claim 9, wherein the at least two antennas are spaced approximately a quarter wavelength apart.

11. The GPS Mobile Unit of claim 10, wherein the GPS Mobile Unit further includes a common frequency source in signal communication with each GPS front-end of the at least two GPS front-ends.

12. The GPS Mobile Unit of claim 11, wherein the common frequency source is a Temperature Compensated Crystal Oscillator ("TXCO").

13. The GPS Mobile Unit of claim 11, further including
   a controller in signal communication with the at least two GPS front-ends and parallel digital signal acquisition and tracking module,
   wherein the GPS Mobile Unit is configured to utilize a set of M GPS satellite acquisition channels, and
   wherein the Controller is configured to allocate a subset of the GPS satellite acquisition channels from the set of M GPS satellite acquisition channels to a first antenna of the at least two antennas and a first front-end of the at least two GPS front-ends based on the received GPS signals.

14. The GPS Mobile Unit of claim 13, wherein each antenna has a non-omni-directional antenna pattern.

15. The GPS Mobile Unit of claim 14, wherein each antenna is a patch antenna.

16. The GPS Mobile Unit of claim 9, wherein the satellite measurement and quality indicator information includes pseudorange, timing, Doppler, signal-to-noise ratio ("SNR"), carrier-to-noise ratio ("CNO"), signal strength measurements, multi-path detector information, satellite heath indication information, and signal jamming indication information.

17. A method for receiving a plurality of GPS signals, at GPS Mobile Unit, from a plurality of GPS satellite utilizing at least two antennas and, in response, determining a location for the GPS Mobile Unit, the method comprising:
- receiving the plurality of GPS signals with at least two GPS receivers, wherein each GPS receiver of the at least two GPS receivers is in signal communication with a corresponding antenna of the at least two antennas;
- utilizing a common frequency signal, from a common frequency source, with the at least two GPS receivers;
- producing GPS measurements and quality indicator information from the received plurality of GPS signals; and
- determining the location for the GPS Mobile Unit utilizing the GPS measurements and quality indicator information.

18. The method of claim 17, wherein receiving the plurality of GPS signals with at least two GPS receivers includes utilizing the at least two antennas that are spaced approximately a quarter wavelength apart.

19. The method of claim 17, further including sending a timing mark signals from a first GPS receiver of the at least two GPS receivers to a second GPS receiver of the at least two GPS receivers.

20. A method for receiving a plurality of GPS signals, at GPS Mobile Unit, from a plurality of GPS satellite utilizing at least two antennas and, in response, determining a location for the GPS Mobile Unit, the method comprising:
- receiving the plurality of GPS signals with at least two GPS front-ends, wherein each GPS front-end of the at least two GPS front-ends is in signal communication with a corresponding antenna of the at least two antennas;
- producing digital GPS signals by the at least two GPS front-ends from the received plurality of GPS signals;
- producing GPS measurements and quality indicator information from the digital GPS signals; and
- determining the location for the GPS Mobile Unit utilizing the GPS measurements and quality indicator information.

21. The method of claim 20, wherein receiving the plurality of GPS signals with at least two GPS receivers includes utilizing the at least two antennas that are spaced approximately a quarter wavelength apart.

22. The method of claim 21, further including utilizing a common frequency signal, from a common frequency source, with the at least two GPS front-ends.

23. The method of claim 22, producing GPS measurements and quality indicator information from the received plurality of GPS signals includes utilizing a set of GPS satellite acquisition channels, and allocating a subset of the GPS satellite acquisition channels from the set of M GPS satellite acquisition channels to a first antenna of the at least two antennas and a first front-end of the at least two GPS front-ends based on the received GPS signals.

* * * * *

UNITED STATES PATENT AND TRADEMARK OFFICE
CERTIFICATE OF CORRECTION

| | | |
|---|---|---|
| PATENT NO. | : 7,642,957 B2 | |
| APPLICATION NO. | : 11/945269 | |
| DATED | : January 5, 2010 | |
| INVENTOR(S) | : Gary Lennen et al. | |

It is certified that error appears in the above-identified patent and that said Letters Patent is hereby corrected as shown below:

1) Figure 9, Sheet 9 of 11, "Sending a timing mark signals from a first GPS receiver of the at least two GPS receivers to a second GPS receiver of the at least two GPS receivers." should read "Sending a timing mark signal from a first GPS receiver of the at least two GPS receivers to a second GPS receiver of the at least two GPS receivers."; See attached 2) Column 5, ln. 14, "that may be reflected off of an inside walls 352" should read "that may be reflected off of an inside wall 352";

3) Column 5, ln. 66, "therefore allowing a situation were" should read "therefore allowing a situation where";

4) Column 7, ln. 12 – 13, "In case of directional antennas" should read "In case of the directional antennas";

5) Column 9, ln. 11, "606 and 608 successfully receive a GPS signal form the same" should read "606 and 608 successfully receive a GPS signal from the same";

6) Column 10, ln. 13, "This allows a equal number of GPS" should read "This allows an equal number of GPS"; and 7) Column 10, ln. 35 – 36, "sends a timing mark signals from a first GPS" should read "sends a timing mark signal from a first GPS".

Signed and Sealed this
Seventh Day of June, 2011

David J. Kappos
*Director of the United States Patent and Trademark Office*